US008898803B1

(12) United States Patent
Hostetter et al.

(10) Patent No.: US 8,898,803 B1
(45) Date of Patent: Nov. 25, 2014

(54) CONTENT AND IDENTITY DELIVERY SYSTEM FOR PORTABLE PLAYBACK OF CONTENT AND STREAMING SERVICE INTEGRATION

(75) Inventors: David W. Hostetter, Kirkland, WA (US); Joseph P. Zipperer, Seattle, WA (US)

(73) Assignee: Media IP, LLC, Seattle, WA (US)

( * ) Notice: Subject to any disclaimer, the term of this patent is extended or adjusted under 35 U.S.C. 154(b) by 516 days.

(21) Appl. No.: 13/004,806

(22) Filed: Jan. 11, 2011

Related U.S. Application Data

(60) Provisional application No. 61/294,070, filed on Jan. 11, 2010.

(51) Int. Cl.
*G06F 21/00* (2013.01)
*G06F 21/10* (2013.01)

(52) U.S. Cl.
CPC ...................................... *G06F 21/10* (2013.01)
USPC .......................................................... 726/28

(58) Field of Classification Search
CPC . H04L 63/0428; H04L 67/06; H04L 67/1008; G06F 21/10
USPC .......................................................... 726/28
See application file for complete search history.

(56) References Cited

U.S. PATENT DOCUMENTS

| 6,223,292 | B1 * | 4/2001 | Dean et al. ....................... 726/28 |
| 6,697,944 | B1 | 2/2004 | Jones et al. |
| 6,859,791 | B1 | 2/2005 | Spagna et al. |
| 7,360,088 | B2 | 4/2008 | Mishina et al. |
| 7,505,584 | B2 | 3/2009 | Kamibayashi et al. |
| 7,779,064 | B2 | 8/2010 | Phillips |
| 7,809,888 | B1 | 10/2010 | Clark et al. |
| 7,844,831 | B2 | 11/2010 | Benhammou et al. |
| RE42,019 | E | 12/2010 | Tagawa et al. |
| 8,306,918 | B2 | 11/2012 | Farrugia |
| 8,312,294 | B2 | 11/2012 | Sato et al. |
| 2002/0126841 | A1 | 9/2002 | Arai |
| 2003/0110209 | A1 * | 6/2003 | Loui et al. ..................... 709/203 |
| 2003/0130822 | A1 * | 7/2003 | Steele ........................... 702/188 |

(Continued)

OTHER PUBLICATIONS

Holfelder et al.; A networked multimedia retrieval management system for distributed kiosk applications; Published in: Multimedia Computing and Systems, 1994., Proceedings of the International Conference on Date of Conference: May 15-19, 1994; pp. 342-351; IEEE Xplore.*

(Continued)

*Primary Examiner* — Bradley Holder
(74) *Attorney, Agent, or Firm* — Lowe Graham Jones PLLC

(57) ABSTRACT

A disclosed system, method and computer readable storage medium includes downloading digital media content from a kiosk to a flash media or other secured portable memory or drive. User service information is also downloaded from the kiosk to the flash media that identifies a streaming service from which the user may also receive content. When the flash media is connected to a playback device, if the device is not connected to a network, the content is played back from the flash media. If the playback device is connected to a network, the streaming service is accessed using the user service information, and the streaming service streams the content to the playback device. In one implementation, the streamed content is of a higher quality (e.g., a high definition version) of the content that was downloaded to the flash media from the kiosk.

14 Claims, 5 Drawing Sheets

(56) References Cited

U.S. PATENT DOCUMENTS

| | | | |
|---|---|---|---|
| 2003/0220835 A1 | 11/2003 | Barnes, Jr. | |
| 2004/0006690 A1 | 1/2004 | Du | |
| 2004/0010601 A1 | 1/2004 | Afergan et al. | |
| 2004/0254940 A1* | 12/2004 | Brush | 707/100 |
| 2005/0025465 A1* | 2/2005 | Danieli | 386/125 |
| 2005/0044280 A1 | 2/2005 | Reisman | |
| 2005/0190782 A1* | 9/2005 | Buckley et al. | 370/437 |
| 2006/0015580 A1* | 1/2006 | Gabriel et al. | 709/219 |
| 2006/0156355 A1 | 7/2006 | Kawasaki et al. | |
| 2006/0200415 A1 | 9/2006 | Lu | |
| 2006/0209102 A1* | 9/2006 | Jones et al. | 347/4 |
| 2006/0224519 A1 | 10/2006 | Ahn | |
| 2006/0239650 A1 | 10/2006 | Heredia et al. | |
| 2006/0284981 A1* | 12/2006 | Erol et al. | 348/207.1 |
| 2007/0033344 A1 | 2/2007 | Tanaka | |
| 2007/0192634 A1 | 8/2007 | Cheon | |
| 2007/0219921 A1 | 9/2007 | Lee | |
| 2007/0234341 A1 | 10/2007 | Chang et al. | |
| 2007/0250384 A1* | 10/2007 | Geller et al. | 705/14 |
| 2008/0034126 A1* | 2/2008 | Baker | 710/11 |
| 2008/0075437 A1 | 3/2008 | Hamada et al. | |
| 2008/0098239 A1 | 4/2008 | Wada et al. | |
| 2008/0133546 A1 | 6/2008 | Phillips | |
| 2008/0176540 A1 | 7/2008 | Khedouri et al. | |
| 2008/0205291 A1* | 8/2008 | Li et al. | 370/254 |
| 2008/0229371 A1* | 9/2008 | Mick et al. | 725/87 |
| 2008/0250120 A1* | 10/2008 | Mick et al. | 709/219 |
| 2008/0270796 A1 | 10/2008 | Suu et al. | |
| 2008/0271154 A1 | 10/2008 | Kamada et al. | |
| 2008/0279533 A1* | 11/2008 | Buttars | 386/94 |
| 2008/0288542 A1* | 11/2008 | Buttars | 707/104.1 |
| 2009/0086978 A1 | 4/2009 | McAvoy et al. | |
| 2009/0150487 A1 | 6/2009 | Wolfish et al. | |
| 2009/0164709 A1 | 6/2009 | Lee et al. | |
| 2009/0282454 A1 | 11/2009 | Ekstrand | |
| 2009/0313432 A1 | 12/2009 | Spence et al. | |
| 2010/0023689 A1 | 1/2010 | Kim | |
| 2010/0057563 A1* | 3/2010 | Rauber et al. | 705/14.53 |
| 2010/0057924 A1* | 3/2010 | Rauber et al. | 709/229 |
| 2010/0070610 A1* | 3/2010 | Buttars | 709/219 |
| 2010/0127013 A1 | 5/2010 | Butler | |
| 2010/0262912 A1 | 10/2010 | Cha | |
| 2010/0280953 A1 | 11/2010 | Kitazato | |
| 2010/0287609 A1 | 11/2010 | Gonzalez et al. | |
| 2010/0293581 A1 | 11/2010 | Robert | |
| 2010/0297933 A1 | 11/2010 | Sim | |
| 2011/0009051 A1 | 1/2011 | Khedouri et al. | |
| 2011/0078722 A1* | 3/2011 | Wendling | 725/31 |
| 2011/0091187 A1 | 4/2011 | Duffin et al. | |
| 2011/0093622 A1 | 4/2011 | Hahn et al. | |
| 2011/0197131 A1 | 8/2011 | Duffin et al. | |
| 2011/0225417 A1 | 9/2011 | Maharajh et al. | |
| 2011/0289137 A1 | 11/2011 | Ittah et al. | |
| 2012/0072713 A1 | 3/2012 | Begum et al. | |
| 2012/0124390 A1 | 5/2012 | Zipperer et al. | |
| 2012/0137135 A1 | 5/2012 | Kasahara et al. | |
| 2012/0233447 A1 | 9/2012 | Fitzgerald | |
| 2012/0254629 A1 | 10/2012 | Zipperer et al. | |
| 2012/0272065 A1 | 10/2012 | Matsukawa et al. | |
| 2012/0315019 A1 | 12/2012 | Zipperer et al. | |
| 2012/0324244 A1 | 12/2012 | Zipperer et al. | |

OTHER PUBLICATIONS

Kurkovsky et al.; Developing an Interactive Kiosk for Mobile Devices: A Practical Experience; International Conference on Wireless Networks. 2004; pp. 747-753; cs.ccsu.edu.*

Young; International Search Report for PCT/US07/22007; mailed May 5, 2008; 1 page.

Android Developers Guide, Android Software Developers Kit (SDK), Android Version 1.543, Nov. 13, 2009, pp. 1-24. Available online at >netmite.com/android/mydroid/1.6/out/target/common/docs/offline-sdk/offline.html<.

Guofei, et al. "PLI: A New Framework to Protect Digital Content for P2P Networks," Year 2003; Microsoft Research Asia, Beijing 100080, China; pp. 1-12.

\* cited by examiner

CONTENT AND IDENTITY DELIVERY SYSTEM FOR PORTABLE PLAYBACK OF CONTENT AND STREAMING SERVICE INTEGRATION

CROSS REFERENCE TO RELATED APPLICATION

This application claims the benefit of U.S. Provisional Application No. 61/294,070, filed Jan. 11, 2010, which is incorporated by reference in its entirety.

BACKGROUND

1. Field of Art

The disclosure generally relates to the field of distributing digital media content via a kiosk, and specifically to integrating a kiosk distribution system with a streaming service.

2. Description of Art

As the popularity of digital media content has increased, so has the demand for acquiring digital media content in quick, convenient ways. One method of distributing digital media content is though kiosk systems. A kiosk is placed where it is accessible to customers. The kiosk is connected via a network to one or more servers having access to storage of licensable digital media content. Customers can interact with the kiosk, for example through a touch screen interface, to select desired digital media content for purchase. The desired digital media content is located either in a storage local to the kiosk or in a remote storage and served to the kiosk. Then, the desired digital media content is downloaded to a storage medium, for example the memory in a customer's digital playback device that has been connected to the kiosk, or another computer-readable medium such as a CD or DVD.

Another method of distributing digital media content is through streaming services. The user connects a playback device, such as a computer or a set-top box to the Internet, selects digital media content available through the streaming service for which the user has an account, and the content is streamed to the user's playback device.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes downloading digital media content from a kiosk to a flash media or other secured portable memory, drive, or device containing secure storage. In addition, user service information is downloaded from the kiosk to the flash media that identifies a streaming service from which the user may also receive content. When a user connects the flash media to a playback device, if the device is not connected to a network, the content is played back from the flash media. If the playback device is connected to a network, the streaming service is accessed using the user service information that was downloaded from the kiosk to the flash media, and the streaming service streams the content to the playback device. In one implementation, the streamed content is of a higher quality (e.g., a high definition version) of the content that was downloaded to the flash media from the kiosk (e.g., a standard definition version). Thus, through the integration of the kiosk delivery system and the streaming service, the user is provided with a portable version of the content from the kiosk for consumption anywhere, regardless of network access, and a higher quality version from the streaming service for consumption when a network connection is available to the playback device.

Example Kiosk Distribution Configuration

Figure 1A:
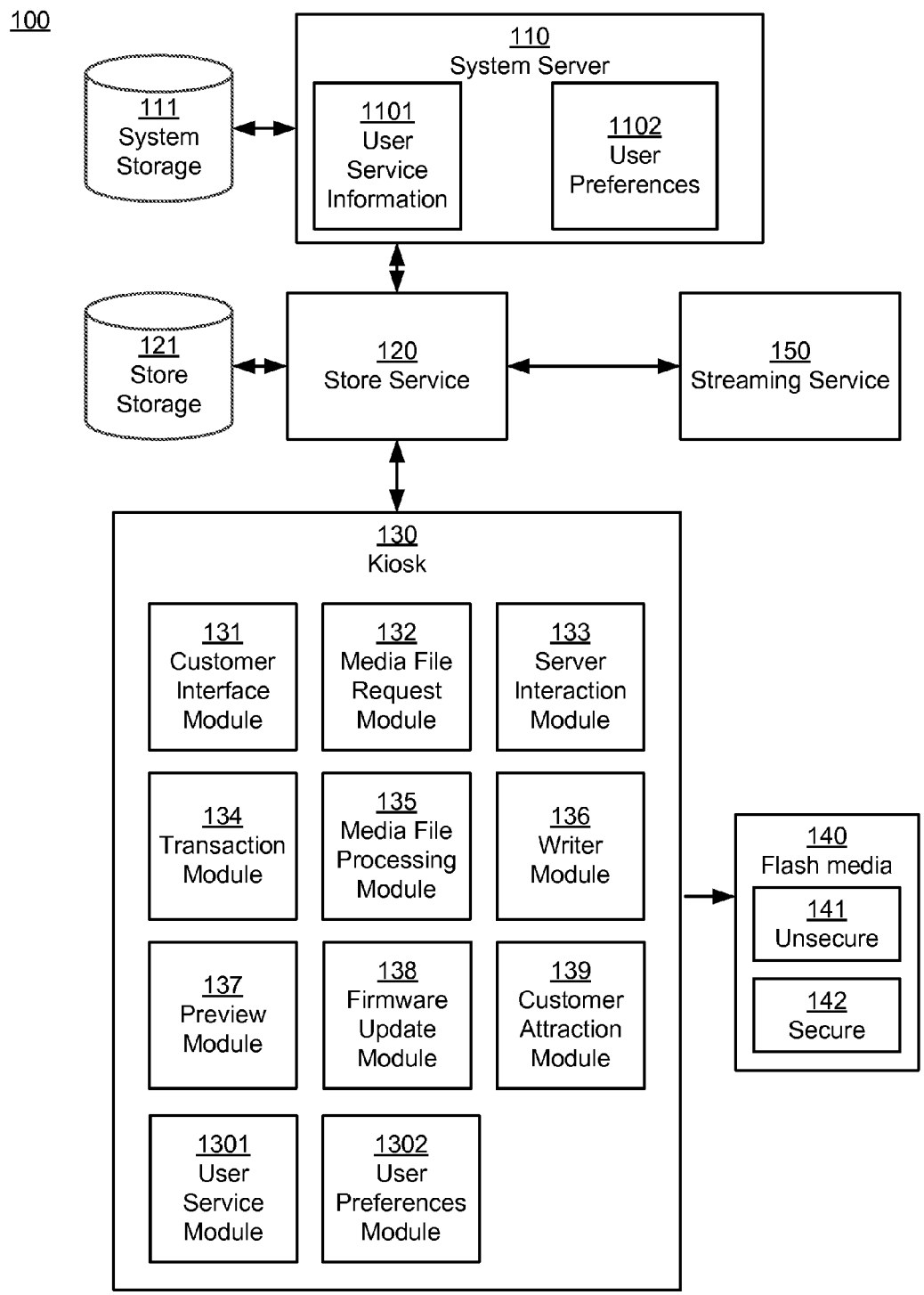
FIG. 1A illustrates an example embodiment of a kiosk distribution system.

FIG. 1A illustrates an example embodiment of a kiosk distribution system 100. The kiosk distribution system 100 includes a system server 110 connected to a system storage 111, at least one store service 120 connected to a local store storage 121, and at least one kiosk 130 connected to a store service 120. Although only one store service 120 and one kiosk 130 are shown in the example system 100 of FIG. 1A, in some embodiments, the kiosk distribution system includes many store services 120 at different retail locations or in other embodiments, all store services/kiosks can be hosted on one machine. In addition, each retail location can include many kiosks 130 connected to a store service 120. One or more communications networks, such as an intranet, the Internet, a local area network, a wide area network, a wireless network, or any other data network such as a cellular network connect the system server 110 to at least one store service 120 and the store service 120 to at least one kiosk 130. The customer connects a flash media 140 to a kiosk 130 in order to download media content to the flash media through the kiosk 130 from the distribution system 100.

The system storage 111 stores media files for distribution to stores through the system server 110. In one embodiment, the system storage 111 includes a database, system files, and user files stored on any combination of storage media. The media files stored in the system storage 111 can include audio, visual, and audio-visual files, for example, music, music videos, movies, television shows, video games, electronic books, etc. The media files may be stored at various quality standards and in various formats in order to accommodate various playback devices. In one embodiment, the process of loading the media files into the system storage 111 is referred to as "ingesting." During the ingest process, the playable content of the media file is stored along with metadata. Metadata includes the title of the playable content, and expanded descriptive information about the content, such as the actors, the director, and/or other information that may appear on or inside a DVD box, for example. In one embodiment, during the ingest process, an industry standard DRM specification of information such as a content description, and a content key is also stored for each media file.

The system server 110 accesses the media files stored in the system storage 111 and distributes them to at least one store service 120 in response to a request for the media file from the store service 120, or based on pre-established distribution policies under which the system server 110 operates. The pre-established distribution policies may be pre-stored in a storage device of the kiosk 120 or in the store service 120 (to which the kiosk is communicatively coupled). The system server 110 includes user service information 1101 and user preferences 1102. User service information and preferences are obtained during a user registration process in order to link the content and streaming services together.

In some embodiments, the user service information 1101 includes a user's account information with streaming service providers 150, such as an individual account identifier and a password or other login information. Some users may have multiple accounts with multiple different streaming service providers 150. The accounts are stored in the user service information 1101 and communicated to the kiosk 130 to be written to the user's flash media 140, for example to the secure area 142.

In some embodiments, the user preferences 1102 include a user's preferences with respect to the user's interactions with the streamed content, such as preferences related to video game controls (inverted y-axis control), sound preferences, etc. For example, the user's preference for content in widescreen or full-screen format may be stored with the user preferences 1102. Additionally or alternatively, the user's preferences for content may be used to make recommendations to the user for additional content. Thus, the user preferences 1102 may be used during both playback and content acquisition phases of the integrated content delivery system.

The store service 120 receives media files from the system server 110, either based on a request from the store service 120 or based on pre-established distribution policies, and the store service 120 stores the media files in the local store storage 121. In one embodiment, the local store storage 121 includes a database, system files, and user files stored on any combination of storage media. The store service 120 also accesses the stored media files from the local store storage 121 in order to deliver them to a kiosk 130 in response to requests from the kiosk 130.

The kiosk 130 receives selections of media from customers, requests selected media files from the store service 120, receives the media files in response to the requests, and writes the media files to the customer's flash media 140. In one embodiment, the kiosk 130 includes a customer interface module 131, a media file request module 132, a server interaction module 133, a transaction module 134, a media file processing module 135, an writer module 136, a preview module 137, a firmware update module 138, a customer attraction module 139, a user service module 1301, and a user preferences module 1302.

The customer interface module 131 manages a graphical user interface presented to a customer, through which, the customer can select media to preview at the kiosk 130 or download to the customer's flash media 140. The customer interface module 131 receives user selections of media for download, for example, by interpreting the user's interactions with a touch screen display of the kiosk 130 or though the user's alphanumeric input into a keyboard, button selections, or selections using a pointing device such as a computer mouse. The customer interface module 131 passes the user's selections to the media file request module 132.

The media file request module 132 prepares requests for media files. The media file request module 132 receives the user's selections of media from the customer interface module 131 and prepares a request for the corresponding media files, for example by performing a lookup of the selected media file.

The server interaction module 133 manages communications between the kiosk 130 and the store service 120. Specifically, the server interaction module 133 receives requests for media files from the media file request module 132 (for example by content availability date) and communicates them to the store service 120. The server interaction module 133 also receives media files from the store service 120 that are distributed to the kiosk 130.

The transaction module 134 manages the payment details of the customer's purchase from the kiosk 130. The transaction module 134 receives the customer's payment information, for example from information read from the swipe of a card through a card reader (not shown) of the kiosk 130. Alternatively the transaction module 134 can receive the customer's payment information as entered by the customer through alphanumeric or other input into the kiosk 130. The transaction module 134 then processes the customer's payment according to the payment information received. The transaction module 134 then verifies and confirms the customer's payment.

The media file processing module 135 processes media files in preparation for writing the files to the flash media 140. The media file processing module 135 receives the requested media files from the store service 120 via the server interaction module 133. The media file processing module 135 then queues the media file for download to the flash media 140. It is noted that an SD card can be provided by the customer (for insertion into an SD card slot of the writer module 136 or otherwise communicatively coupled to the writer module 136, such as through a USB adaptor attached to a USB port of a kiosk 130) or may be provided through a kiosk that includes a pre-retained (e.g., stacked) quantity of SD cards that can be inserted into the writer module 136 and subsequently discharged for the customer when the process described herein completes writing to the SD card. Other devices may contain either removable or non-removable SD cards. The SD cards within these devices may also be accessed via USB, or through data networks such as wifi or cellular, as long as a secure data transport mechanism exists.

Continuing on, the writer module 136 writes the media file to the flash media 140. In one embodiment, the writing to the flash media 140 is in compliance with the DRM standards of security known as Content Protection for Recordable Media (CPRM). In one embodiment, the writer module 136 is a high-speed writer capable of writing data to both an unsecured area 141 of the SD card as well as a secure area 142 of the SD card as needed for SDSD-DRM.

The preview module 137 manages the playback of previews of media files that are available for purchase. The preview module 137 can operate in parallel with the writer module 136 so that a customer can preview other media files of the customer's choice while the customer's selected media file is downloading to the flash media 140. Alternatively, the preview module 137 can show a customer a preview selected randomly or selected based on the content that the customer is downloading. Advantageously, the preview module 137 can show previews without affecting the performance of the writer 136. In one embodiment, the write process is designed to use a low amount of resources to avoid contention with the preview module 137.

The firmware update module 138 receives firmware updates (e.g., firmware software updates) for use in updating firmware on the playback devices that use the flash media 140. The firmware updates are disseminated by the system server 110 through the store service 120 to the kiosk 130. The firmware update module 138 queues firmware updates to be written by the writer module 136 to the flash media 140, for example during or after the media file is written. In one embodiment, the firmware update code is scrambled and signed to prevent tampering. Subsequently, when the flash media 140 is inserted into a playback device, the playback device checks to see if the version of the firmware on the flash media supersedes the version of the firmware currently on the playback device, and if it does, then the firmware update is loaded onto the playback device. Thus, through the flash media, a mechanism is provided to update firmware present on a playback device without requiring the playback device to have any network connection. It is noted that this is an optional process to update firmware on devices that playback flash media 140.

The customer attraction module 139 enables the kiosk 130 to function as a digital sign, for example, while a customer is not actively engaging in the selection or download of media files. Through the kiosk 130, the customer attraction module 139 plays previews, such as movie previews, short segments of media files, and/or advertisements to download particular media files, in order to entice customers to make a purchase. Advantageously, the customer attraction module 139 can be programmed to only play previews from, segments of, or advertisement for media files that are currently available for download from the kiosk 130. The customer attraction module 139 can be synchronized with the content of the system storage 111 so that the kiosk 130 is only attracting customers to purchase items that are available immediately for purchase. In one embodiment, the customer attraction module 139 plays a loop of previews configured based on data available at the store service 120, which is a subset of the data available on the system server 110. For example, an operator of the system server 110 uses the system server 110 to make updates to the list of previews and/or advertisements in the storage 111. The system server 110 and the store service 120 work in concert to move these updates first to the local store storage 121 and then to the kiosk 130. These updates then propagate to the list of previews and/or advertisements displayed by the preview module 137. This allows a system operator at a central location to update the previews and/or advertisements displayed in many kiosks 130 located in many different physical locations.

The user service module 1301 receives information about streaming services 150 with which the user has registered. In various embodiments, the information can be stored at the system server 110 level or the store service 120 level. In one embodiment, information about what streaming services 150 have which content available for streaming in high definition is collected during the ingest process and metadata from a streaming service 150 is linked into information provided to the store service 120. Then, when a customer downloads content to the customer's flash media 140, the user service module 1301 notifies the streaming service 150 of the content acquisition. In other embodiments, if a user has accounts with multiple streaming services 150, the kiosk 130 may present options to the user for selection through the customer interface module 131. The user service module 1301 forwards the information about one or more streaming services with which the user has registered to the writer module 136 to be written to the flash media 140.

The user preferences module 1302 receives a user's preferences 1102 that have been stored, for example, at the system server 110 level or the store service 120 level. For example, the user preferences 1102 can be used by streaming services to tailor a user's experience with the content, such as preference for content in wide-screen or full-screen format, and other user preferences 1102 that may be used during content acquisition and playback phases of the integrated content delivery system. The user preferences module 1302 forwards the user's preferences to the writer module 136 to be written to the flash media 140.

Figure 1B:
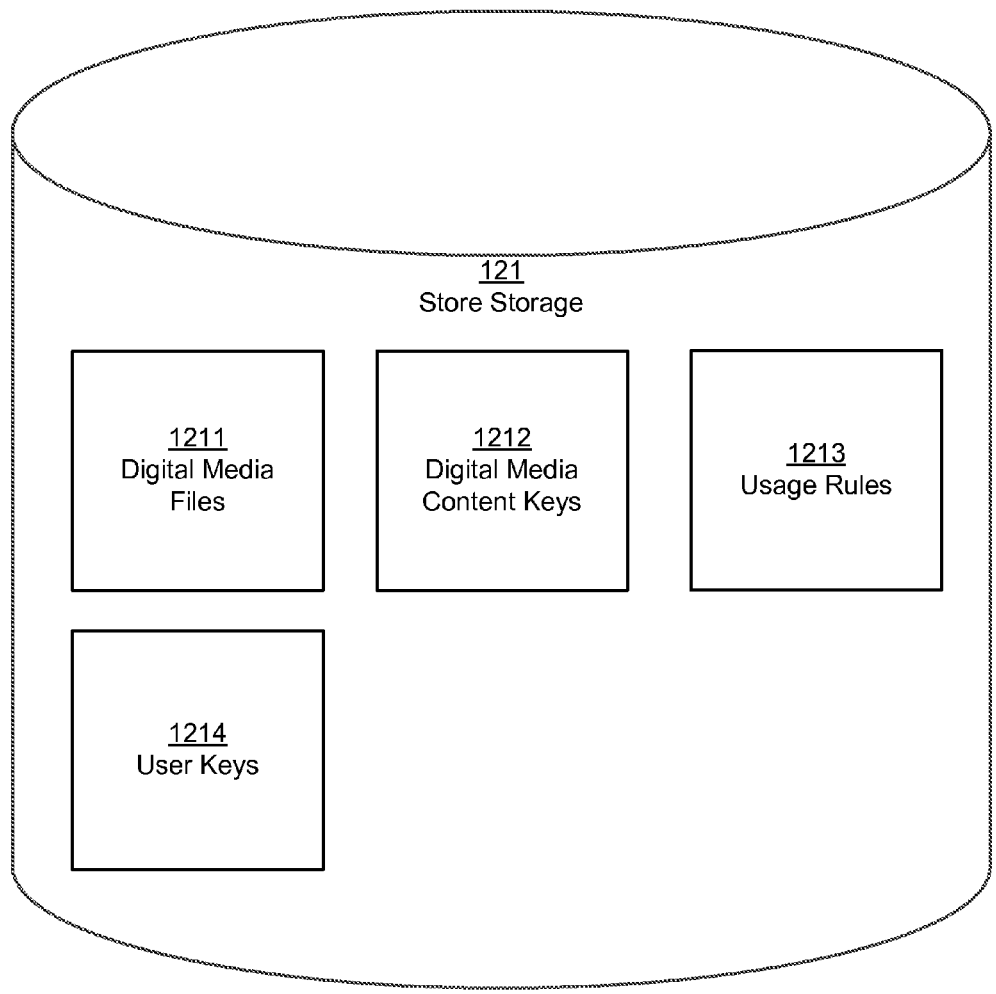
FIG. 1B illustrates an example embodiment of a store storage of the kiosk distribution system.

FIG. 1B illustrates an example embodiment of a local store storage 121 of the kiosk distribution system 100 described with reference to FIG. 1A. The local store storage 121 includes digital media files 1211, digital media content keys 1212, usage rules 1213, and user keys 1214.

As described above, the digital media files 1211 can include audio, visual, and audio-visual files, for example, music, music videos, movies, television shows, video games, electronic books, etc. The digital media files 1211 may be stored at various quality standards and in various formats in order to accommodate various playback devices. The digital media files 121 stored in local store storage 121 are immediately available to be downloaded to a customer's flash media 140.

The digital media content keys 1212 are necessary to decrypt the digital media files 1211 stored within local store storage 121. The mapping between the digital media content keys 1212 and the digital media files 1211 that can be unlocked with the digital media content keys 1212 is also stored in the local store storage 121.

The usage rules 1213 are a set of rules that govern how a digital media file 1211 can be used. In one embodiment, each digital media file 1211 has a set of usage rules that determines the specific parameters required by the DRM and the media providers (holders of the intellectual property rights to the digital media file). A usage rule of the usage rules 1213 may cover one or more media files 1211.

The user keys 1214 are used to write to an SD card with SDSD-DRM. Two encryption keys are required to complete the write process. The first is the digital media content key from the digital media content keys 1212 stored in the local store storage 121. The second is the user key which is specific to the flash media 140 and used to encrypt the digital media content key. While content keys are loaded with the digital media file, user keys are either generated at the server level or loaded to the server 110 when they were generated by a different kiosk in the system 100. User keys are specific to SDSD-DRM. Alternate DRMs may be used that are compatible with flash memory or SD cards.

Computing Machine Architecture

Figure 2:
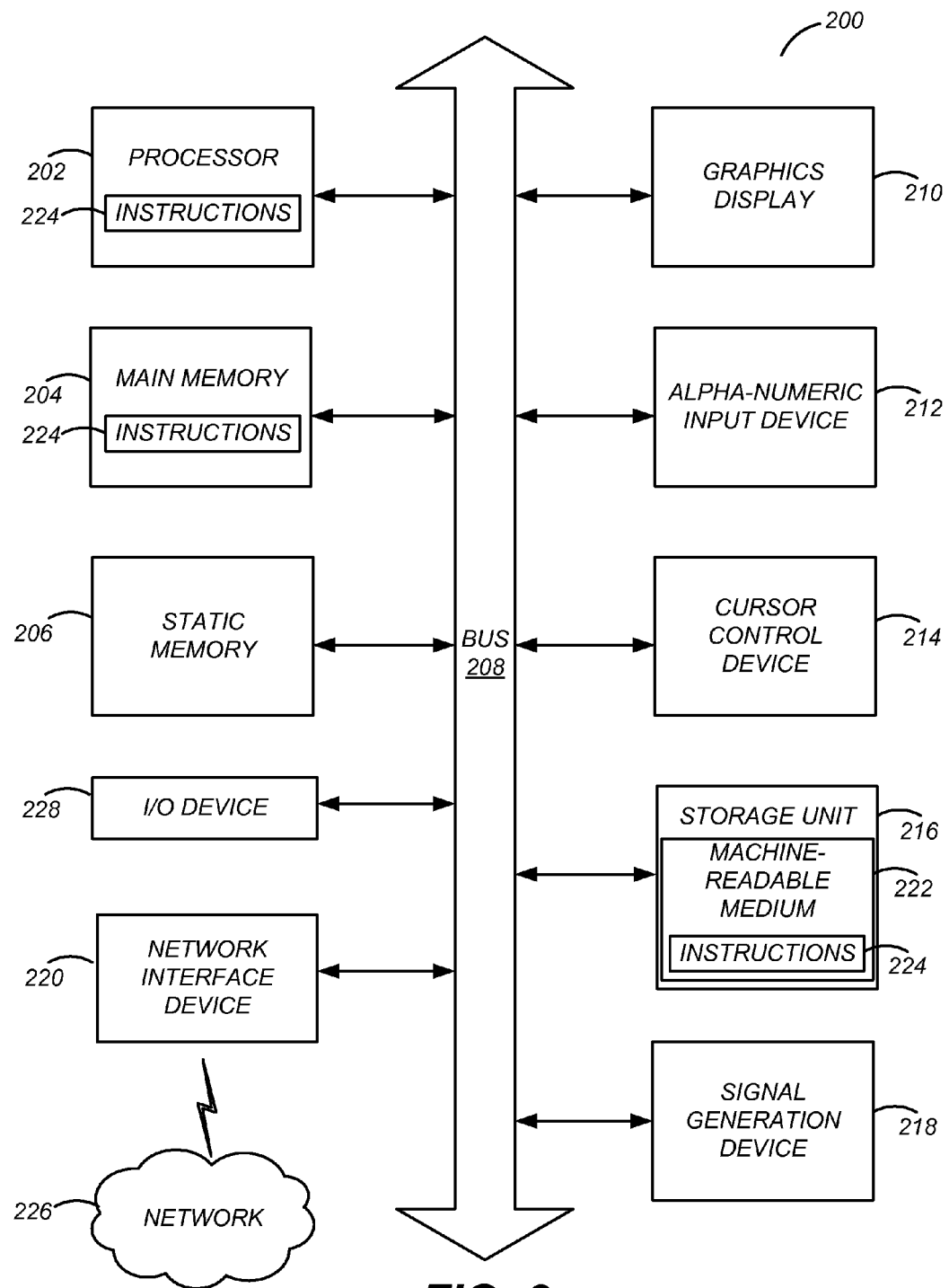
FIG. 2 illustrates one embodiment of components of an example machine able to read instructions from a machine-readable medium and execute them in a processor (or controller) for use as a server or a kiosk.

FIG. 2 is a block diagram illustrating components of an example machine able to read instructions from a machine-readable medium and execute them in a processor (or controller). The example machine as described provides the machine structure for executing functionality of the components of the example kiosk distribution configuration. For example, the machine is configured for use as a system server 110, a store service 120, and/or kiosk 130. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)) that may be configured with touch screen functionality in some embodiments. The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), an input/output (I/O) device 228, and a network interface device 220, which also are configured to communicate via the bus 208. It is noted that in one embodiment the I/O device 228 can be a hardware component configured to read and write to SD cards or other flash media. The hardware component is configured to physically couple with the SD card or other flash media so that the SD card or other flash media communicatively couples with the computer system 200.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Portable Playback of Content and Streaming Service Integration

Before a user can connect to a streaming service, the streaming service information must be collected and stored within system storage 111. User service information 1101, including user identifier and applicable passwords for authentication and authorization are collected from the user. This information may be collected at the kiosk 130, from the user's device accepting flash media 140, or through other methods such as an Internet website or mobile device application.

Alternatively, the user service information 1101 can be obtained through a network connection or other data feed from the streaming service provider such that the user need not reenter the service information into the content delivery system connected to the kiosk 130. As a matter of practice, it is preferred to obtain the information from the data feed so that the data stored within the system servicer 110 is considered a cache whereas the information in the streaming service is authoritative. This facilitates changes to user data propagating through the system as opposed to duplicate, and possible data synchronization issues between the kiosk content delivery network and that of the streaming service itself.

User preferences 1102 are loaded in the same manner as the user service information 1101, either by direct input through various interfaces, or via data feed from the service provider. The preference for loading, storing, and updating the user preferences 1102 has the same general concerns for data synchronization as previously noted.

As described below, for devices that support direct loading to secure flash through the device, federated identity information can also be included as user service information 1101. By using federated identity, if the user as already authenticated to the device, the authentication state can also be transferred such that a subsequent authentication is not required to access user preferences.

Users who are not currently enrolled with streaming services integrated with kiosk delivery may also enroll through the kiosk system 100 as an alternative to registering through current registration methods. Likewise, users may change their service information via the kiosk, and that information is then synchronized back to the service provider. The kiosk system 100 therefore represents an additional customer touch point beyond the streaming devices, website, and other methods traditionally used by streaming service providers to register customers and manage their information.

Figure 3:
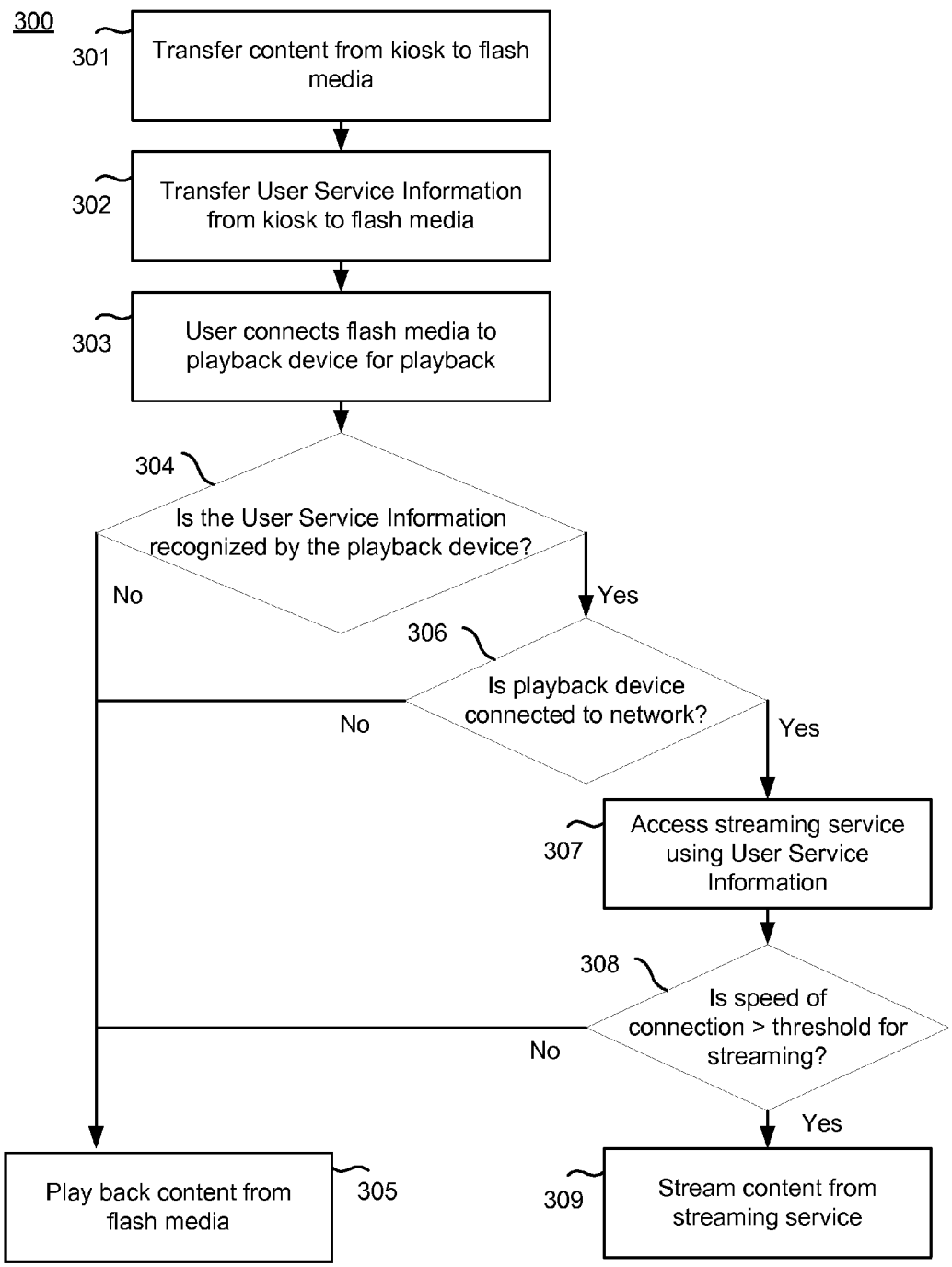
FIG. 3 illustrates an example embodiment of a method of integrating a kiosk delivery system and a streaming service.

FIG. 3 illustrates an example embodiment of a method 300 of integrating a kiosk delivery system and a streaming service. The example method of FIG. 3 will be described herein with reference to transferring a selected movie purchased from a kiosk 130 to be loaded onto a flash media 140 to be watched later by a customer on a playback device. The method 300 described herein can also be used to transfer other media files from a kiosk 130 to a flash media 140 securely and at high-speed.

In step 301, the kiosk 130 responds to a user browsing through available digital content. Alternatively the user can search a digital content library available on the kiosk 130. When the user decides on a purchase, the content is transferred 301 from the kiosk to the flash media 140. The usage rules 1213 for the content are also transferred to the flash media 140.

In step 302, user service information 1101 is transferred from the kiosk 130 to the flash media 140. The user service information 1101 includes information necessary to access a streaming service 150 for the delivery of content over a network.

In step 303, the user connects the flash media to a playback device. Once the flash media has been connected 303 to the playback device for playback, a check is made to determine 304 if the user service information 1101 is recognized by the playback device. If the playback device does not recognize the user service information 1101, then the content is played back from the flash media in step 305. If the playback device recognizes the user service information 1101, then the method 300 advances to step 306.

In step 306, a check is made to determine if the playback device is connected to a network that enables access to the streaming service identified by the user service information 1101. If the playback device is not connected to a network that allows access to the streaming service, content is played back from the flash media in step 305. If the playback device is connected to a network that allows access to the streaming service, the streaming service is accessed in step 307 using the user service information 1101 downloaded from the kiosk 130. In one embodiment, the user service information enables the playback device to automatically log in to the streaming service, for example, by providing the user's identifier and any log-in credentials needed to access the streaming service.

In step 308, a check is made to determine if the speed of the connection to the streaming service exceeds the threshold for streaming content in order to maintain the quality and integrity of the streamed content. If the speed of the connection does not meet the threshold for quality, then the method 300 reverts to playing the content back from the flash media in step 305. If the speed of the connection is adequate, then the method advances to step 307. Such technologies as adaptive streaming are also compatible with this method. If the streaming threshold is not met at anytime during the streaming process, playback can continue from the flash media.

In step 307, the content is streamed from the streaming service. In one embodiment, the streamed content is of a higher quality than the version of the content that was downloaded from the kiosk 130. For example, the streamed content may be in high definition, whereas the content downloaded from the kiosk 130 may be in standard definition. Thus, through the integration of the kiosk delivery system and the streaming service, the user is provided with a portable version of the content from the kiosk for consumption anywhere, regardless of network access, and a higher quality version from the streaming service for consumption when a network connection is available to the playback device.

Figure 4:
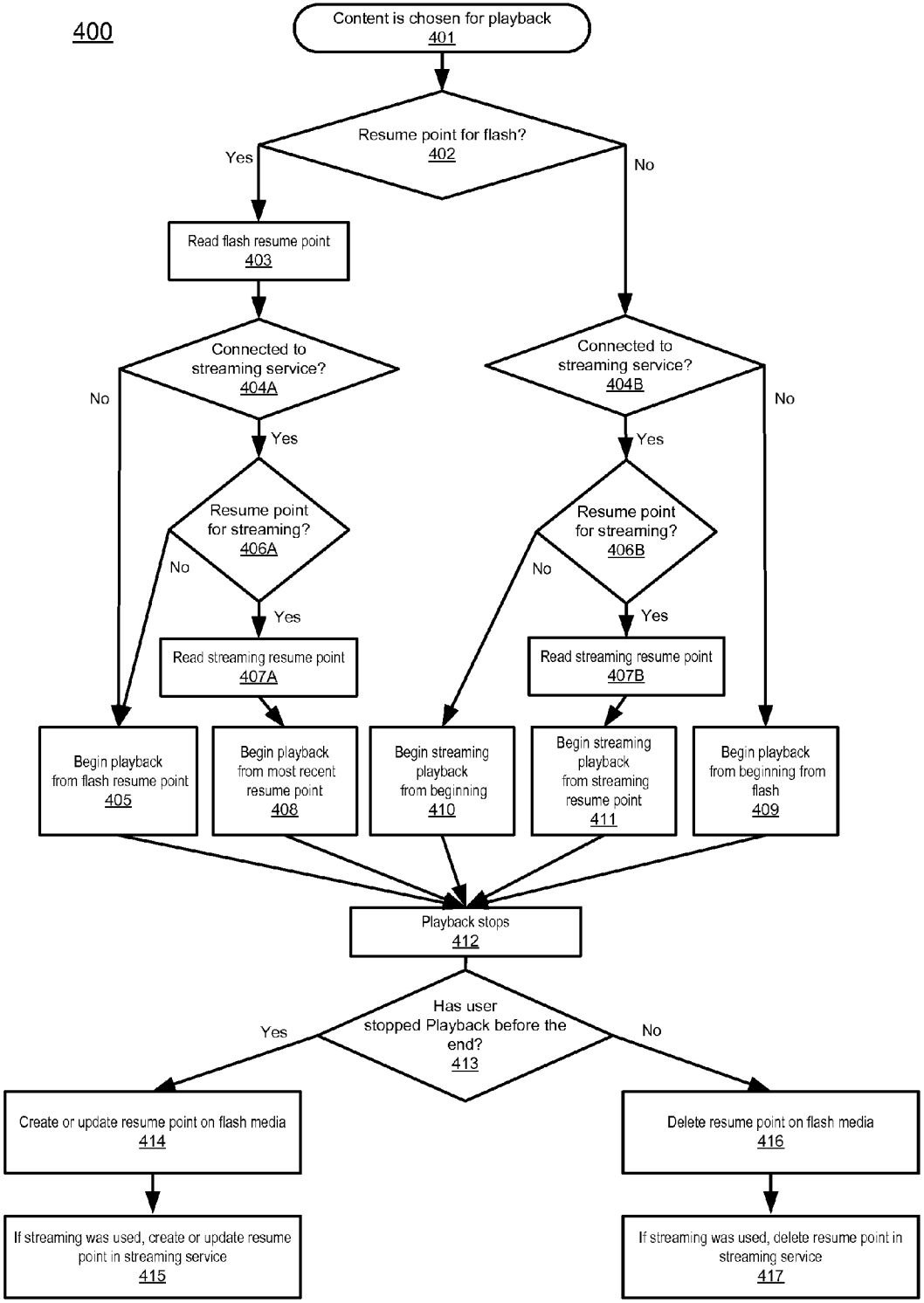
FIG. 4 illustrates an example embodiment of a method of transferring a resume point for playback from content downloaded from a kiosk to a version of the content from a streaming service.

FIG. 4 illustrates an example embodiment of a method 400 of transferring a resume point for playback from content downloaded from a kiosk to a version of the content from a streaming service. Thus, through the integration of content from the kiosk delivery system and the streaming service, the user can continue the playback of the content from the point at which playback was stopped, regardless of whether the playback is continued from the flash media 140 or from a streaming service.

In step 401, content is chosen for playback. In step 402, a check is made to determine if a resume point has been stored for the content on the flash media. If a resume point is present, in step 403, the resume point for the content on the flash media is read.

In step 404A, a check is made to determine if the playback device is connected to a streaming service. If the playback device is not connected to a streaming service, then in step 405, playback is begun from the flash resume point that was read at step 403. If the playback device is connected to a streaming service, then at step 406A, a check is made to determine if a resume point for the streaming content has been stored. If no resume point for the streaming content is available, then the method progresses to step 405 where playback begins from the flash resume point. The playback may be from either the flash media or a streaming service according to the process described above with reference to FIG. 3. On the other hand, if a resume point for the content is available from the streaming service, then it is read at step 407A. Thus, in this situation, there is a flash resume point and a streaming resume point. In one embodiment, a check is made to determine which of the resume points has been recorded more recently. Then, in step 408, playback is begun from the most recent resume point from among the recorded resume points.

Referring back to step 402, if there is no resume point for playback from the flash media, then a check is made for a connection to the streaming service 404B. If no connection is available, then playback is begun from the beginning of the content from the flash media at step 409. If a connection to a streaming service is available, in step 406B, a check is made to determine if a resume point for the streaming content has been stored. If no resume point is available, then streaming playback begins from the beginning of the content at step 410. On the other hand, if a resume point for the content is available from the streaming service, then it is read at step 407B, and in step 411, playback is begun from the streaming resume point.

At some point during the playback, the playback is stopped 412. In step 413, a check is made to determine whether the user has stopped playback before the end of the content. If the user has stopped playback before the end, then in step 414, a resume point is created or updated on the flash media. In one embodiment, the resume point is recorded by recording the time elapsed from the beginning of the playback. In one embodiment, the resume point is recorded on the flash media 140. Additionally or alternatively, the resume point is recorded in the playback device. In another embodiment, the time that the resume point is recorded is also stored for comparison in step 408. Then, at step 415, if a streaming service was used, a resume point is created or updated for the streaming service. If, at step 413, it is determined that the user has not stopped playback before the end, then in step 416, any resume point for the content is deleted from the flash media. In step 417, if a streaming service was used, any resume point for the content is deleted from storage at the streaming service.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated, e.g., in FIGS. 1, 2 and 3. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein, e.g., in FIG. 3, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), for example, the process noted in FIG. 3. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," and "content," or the like. These words, however, are merely convenient labels and are to be associated with appropriate physical quantities.

Unless specifically stated otherwise, discussions herein using words such as "processing," "computing," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the articles "a" or "an" are employed to describe elements and components of the embodiments herein. This is done merely for convenience and to give a general sense of the invention. This description should be read to include one or at least one, and the singular also includes the plural unless it is obvious that it is meant otherwise.

Upon reading this disclosure, those of skill in the art will appreciate still additional alternative structural and functional designs for a system and a process for integrating a kiosk delivery system and a streaming service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method of delivering content by integrating a kiosk delivery system with a streaming service, the method comprising:
   transferring content from a kiosk to a flash memory media device, wherein the flash memory media device is configured to be connected to a playback device; and
   transferring user service information, including user account information for one or more account based digital content streaming services, from the kiosk to the flash memory media device,
   wherein, responsive to the flash memory media device being connected to the playback device:
   if the playback device is connected to a network via a network connection having a speed that meets a threshold for streaming digital content, the transferred user service information from the connected flash memory media device is used to access at least one of the one or more account based digital streaming services to stream a higher quality version of the content to the connected playback device for playback, wherein the higher quality version of the content is a high definition version of standard definition content transferred from the kiosk to the flash memory media device,
   otherwise, the content stored on the connected flash memory media device is used for playback of the content.

2. The method of claim 1, wherein the user account information for each account based digital streaming service comprises an account identifier and login information.

3. The method of claim 1, wherein user service information includes information necessary to access a digital streaming service for delivery of content over a network.

4. The method of claim 1, wherein the content transfer can occur without removing the flash memory media device from a device containing the flash memory media device.

5. The method of claim 1, wherein the content transfer can occur by removing the flash memory media device from a device containing the flash memory media device.

6. The method of claim 1, wherein the user service information is received from a user device.

7. The method of claim 1, wherein the user service information is received through a website.

8. The method of claim 1, wherein the user service information is received from a data feed from a provider of the streaming service.

9. The method of claim 1, wherein users can register for the streaming service at the kiosk.

10. The method of claim 1, wherein users may update user service information via the kiosk.

11. A method of operating a playback device to automatically play back content from either a flash memory media device or a digital streaming service depending upon playback circumstances, the method comprising:
   receiving, from a connected flash memory media device, user service information, including user account information for an account based digital media content streaming service, wherein the user service information enables access to the account based digital media content streaming service; and wherein the connected flash memory media device previously has received content from a kiosk delivery system including the user service information that includes user account information for one or more account based digital streaming services;
   responsive to the user service information being unrecognized by the playback device, playing back the content from the connected flash memory media device, the content previously received from the kiosk delivery system; and
   responsive to the user service information being recognized by the playback device:
   responsive to the playback device not being connected to a network, playing back the content from the connected flash memory media device; and
   responsive to the playback device being connected to a network, accessing the account based digital media content streaming service using the user service information, by:
   responsive to a speed of the connection not meeting a threshold for streaming digital content, playing back the content from the connected flash memory media device; and
   responsive to the speed of the connection meeting the threshold for streaming digital content, streaming the content from the account based digital media content streaming service, wherein streaming the content from the account based digital media content streaming service comprises streaming the content in high definition, and wherein the content on the flash memory media device is standard definition.

12. The method of claim 11, wherein accessing the account based digital media content streaming service using the user service information comprises automatically logging the user into the account based digital media content streaming service.

13. The method of claim 11, wherein the threshold is a lower limit on speed consistent with avoiding service interruptions.

14. The method of claim 11, wherein a flash memory media device can be transferred between playback devices.

\* \* \* \* \*